United States Patent [19]

Bauer et al.

[11] 4,379,127

[45] Apr. 5, 1983

[54] METHOD OF RECOVERING MOLYBDENUM OXIDE

[75] Inventors: Günter Bauer, Fürth; Joachim Eckert, Zirndorf, both of Fed. Rep. of Germany

[73] Assignee: GfE Gesellschaft für Elektrometallurgie mbH, Düsseldorf, Fed. Rep. of Germany

[21] Appl. No.: 308,845

[22] Filed: Oct. 5, 1981

[30] Foreign Application Priority Data

Jul. 22, 1981 [DE] Fed. Rep. of Germany ....... 3128921

[51] Int. Cl.$^3$ .............................................. C01G 39/02
[52] U.S. Cl. ........................................ 423/55; 423/53; 423/159; 423/161; 423/166
[58] Field of Search ..................... 423/55, 53; 423/159, 423/161, 166

[56] References Cited

U.S. PATENT DOCUMENTS

| | | | |
|---|---|---|---|
| 3,656,888 | 4/1972 | Barry et al. | 423/606 |
| 3,714,325 | 1/1973 | Bloom et al. | 423/53 |
| 3,833,352 | 9/1974 | Vojkovic | 423/606 |
| 3,911,076 | 10/1975 | Probert et al. | 423/53 |
| 4,165,362 | 8/1979 | Reynolds | 423/53 |

*Primary Examiner*—Herbert T. Carter
*Attorney, Agent, or Firm*—Karl F. Ross; Herbert Dubno

[57] ABSTRACT

A method of recovering molybdenum oxide by oxidation of a molybdenum sulfide concentrate contaminated with impurities wherein the concentrate in an average particle size in the range of 20 to 90 microns is suspended to form an aqueous suspension which is oxidized at elevated temperature and an elevated oxygen partial pressure in an autoclave. The suspension withdrawn from the autoclave is subjected to filtration to remove the molybdenum oxide from the primary filtrate containing sulfuric acid and this filtrate is neutralized with lime to form calcium sulfate which is then removed from the suspension to provide a second filtrate. According to the invention, only this second filtrate is recirculated at a rate such that the suspension density in the oxidation stage is between 100 to 150 g of solids per liter and this suspension density is maintained in the oxidation stage by the recirculation.

2 Claims, 1 Drawing Figure

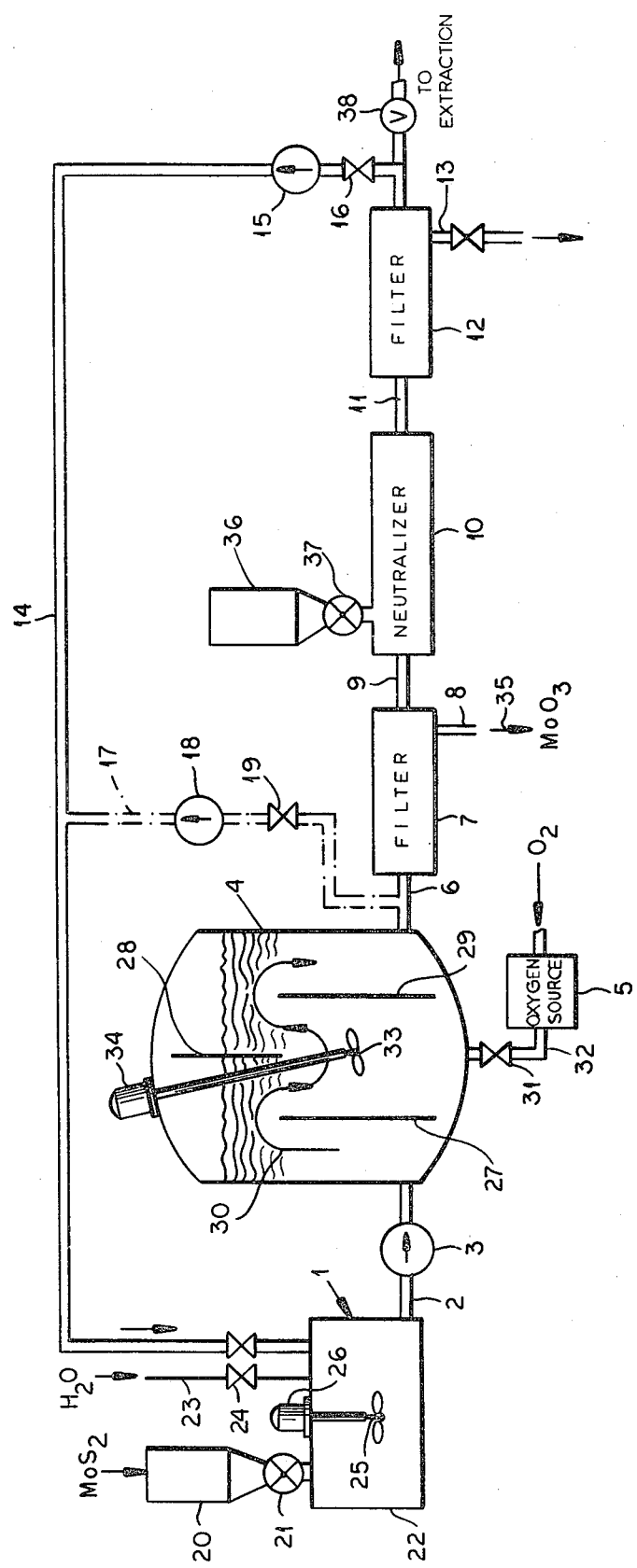

METHOD OF RECOVERING MOLYBDENUM OXIDE

FIELD OF THE INVENTION

Our present invention relates to the recovery or production of molybdenum oxide and, more particularly, to a method of obtaining molybdenum oxide from a molybdenum sulfide concentrate contaminated with various impurities.

BACKGROUND OF THE INVENTION

Various methods have been proposed heretofore to produce or recover molybdenum oxide from starting materials including molybdenum sulfide and utilizing oxidation treatment of the molybdenum concentrate. Reference may be had to German open application 20 03 874 and German Pat. No. 28 30 394.

From these publications it is known to suspend a molybdenum sulfide concentrate, with the usual amounts of foreign matter or impurities, of a particle size range of 20 to 90 microns, in water in a slurrying or suspending stage and then to feed this aqueous suspension into an autoclave.

The autoclave constitutes the oxidation stage and, in the autoclave, the suspension is subjected at elevated temperatures to an increased oxygen partial pressure, the oxygen being, for example, bubbled through the suspension.

The molybdenum sulfide within the suspension is transformed into molybdenum oxide which remains in suspension as a solid while sulfuric acid is produced.

In a first filtering stage, the molybdenum oxide is recovered from a first filtrate containing the sulfuric acid which can be neutralized with lime or calcium carbonate to form calcium sulfate (gypsum) in a neutralization stage.

At a second filtering stage, the calcium sulfate or gypsum is filtered from the liquid phase which constitutes a second filtrate. The second filtrate can be recirculated to the suspending or slurrying stage.

In conventional apparatus for carrying out this process on stream, the output of molybdenum oxide is a function of the throughput of the apparatus and make-up water must be supplied to replace the water which is removed from the system adherent to the molybdenum oxide and the calcium sulfate.

The system of German Pat. No. 28 30 394, involves a two-stage recirculation.

In a first recirculation phase, the oxidizing suspension from the oxidation stage, prior to filtering the molybdenum oxide therefrom, is partly recirculated and combined with molybdenum sulfide concentrate for return to the autoclave. This recirculation is effected until the sulfuric acid concentration reaches 80 to 120 g/liter, whereupon molybdenum oxide is extracted from at least a portion of the output from the autoclave.

In this system, the first filtrate is treated with lime to a pH of 0.9 to 1.5 and the resulting calcium sulfate is filtered off with the second filtrate thus obtained being recirculated to the suspension or slurrying stage for combination with molybdenum sulfide concentrate and delivery to the autoclave. Obviously this results in an increase in the impurity content of the recirculated secondary filtrate with time.

It has also been suggested that the enriched second filtrate be brought to a pH of 2.5 with alkali hydroxide and this treated filtrate oxidized in an autoclave to produce iron molybdate which can be filtered therefrom with the resulting filtrate being utilized for the recovery of valuable by-products in the form of the impurities in which the second filtrate was enriched.

The aforedescribed systems had the advantage, therefore, that they permitted enrichment of the impurity levels in the secondary filtrate to concentrations which could enable the economical recovery of these impurity elements.

Experience has shown that these systems, however, are not free from disadvantages. For example, where the molybdenum oxide is recirculated, encrustation of the autoclave was to be feared and it was necessary to recirculate the filtrate in a hot state to maintain the thermal balance in the autoclave which undergoes an exothermic reaction ($MoS_2 + 9/2\ O_2 + 2H_2O = MoO_3 + 2H_2SO_4$).

In the earlier system, the suspension density was about 50 to 75 g of suspended solids per liter. While the prior method resulted in an effective production of molybdenum oxide, bearing in mind the limitations of throughput and the problems mentioned previously, it was found that the energy requirements of the process were excessive notwithstanding the fact that an exothermic reaction was involved.

OBJECTS OF THE INVENTION

It is the principal object of the present invention to provide an improved method of recovering molybdenum oxide whereby the disadvantages of earlier systems as discussed above are avoided and the molybdenum oxide can be produced with a high throughput and high efficiency with a simplified apparatus and reduced energy input.

Another object of our invention is to provide a method of recovering molybdenum oxide which is more economical and affords more efficient use of the apparatus then has hitherto been the case.

SUMMARY OF THE INVENTION

We have discovered that the energy input to a system for the recovery of molybdenum oxide from molybdenum sulfide concentrate contaminated with foreign elements can be markedly reduced and the throughput of a given installation increased in a method wherein the molybdenum sulfide concentrate in a partial size range of 20 to 90 microns, preferably 70 microns, is initially suspended in water, the aqueous suspension is then introduced into an autoclave in which an elevated temperature and oxygen partial pressure is maintained for oxidation of the sulfide to molybdenum oxide, the suspension is then subjected to filtration to remove the molybdenum and produce a first filtrate containing sulfuric acid, the first filtrate is treated with lime to neutralize the acid and form calcium sulfate, and the calcium sulfate is then removed in a second filtration producing a second filtrate, if, during the oxidation stage, the suspension density is maintained between substantially 100 and 150 g of suspended solids per liter and this suspension density is controlled by recirculation only of the second filtrate, i.e. in the entire system only one liquid is recirculated, namely, the second filtrate and this recirculation to the suspending stage is effected such that the suspension density resulting in the oxidation stage is always between 100 and 150 g per liter.

Surprisingly, this precludes any detrimental encrustation in the pipelines or the oxidation stage and allows the desired reaction temperature to be maintained without the need for heating the recirculated medium. Both the throughput and the reaction efficiency are improved and the apparatus for carrying out the invention is simplified because the means required for the first recirculation stage discussed previously can be eliminated.

We have found that the energy consumption per kg of molybdenum oxide produced can be significantly reduced and that the need for multistage recirculation characterizing prior art systems is obviated.

The build-up of the suspension density within the autoclave is not required and the desired suspension density of 100 to 150 g/liter of molybdenum disulfide can be effected initially within the oxide stage to thereby produce a concentration of sulfuric acid amounting to 100 to 150 g/liter prior to neutralization.

Occasionally it may be desirable to provide a recirculation path in which after the first passage through the autoclave, molybdenum oxide can be filtered and the partially neutralized filtrate recycled through the suspension stage. Molybdenum solubilized in the filtrate is not, as in prior techniques, reacted with oxygen in the autoclave but precipitates simultaneously largely as the iron molybdate. After operation for some time the solution is found to contain 10 to 20 g of soluble molybdenum per liter and this solution can be subjected to extraction directly for recovery of molybdenum. The method of the invention is thus found to be substantially more economical than even the pressure leaching process of the prior art and is especially characterized by the fact that repeated reheating of recirculated solutions is unnecessary.

Note may be taken of the fact that the system of the invention uses a single-stage recirculation. A process for the recovery of molybdenum oxide from a molybdenum sulfide concentrate with a single-stage recirculation has been described in the German open application 20 48 874, but here it is necessary to operate with a particle size below 20 microns, preferably about 5 microns, and the filter cake obtained after the first filtration is found to contain significant quantities of non-reacted molybdenum disulfide as well as impurities which must be removed.

Furthermore, during the neutralization, molybdenum oxide is eliminated from the solution and must be recovered from the filter cake of the second filtration.

In this system as well some of the first filtrate is recirculated to the autoclave. This has the disadvantage of increasing the acidity of the suspension to be reacted. In the system of the present invention, excessive acidity cannot reach the oxidation stage and is precluded by the neutralization step preceding the recirculation.

BRIEF DESCRIPTION OF THE DRAWING

The sole FIGURE of the drawing is a flow diagram illustrating the process of the present invention.

SPECIFIC DESCRIPTION AND EXAMPLE

A molybdenum disulfide concentrate containing impurity elements is fed by a hopper 20 and a metering device 21 into a mixing tank 22 forming part of a suspending stage 1 and is slurried or suspended in water supplied via line 23 and a valve 24, the distribution of the particles, which have a particle size of about 70 microns, being assured by a stirrer 25 driven by motor 26.

The aqueous suspension is delivered by a pump 3 and a line 2 to an autoclave 4 which is operated under a pressure such that the oxygen partial pressure therein is between 10 and 20 bar, the autoclave having baffles 27, 28 and 29 to ensure a meandering path represented by the arrow 30 for the suspension.

Oxygen is fed from an oxygen source 5 via the valve 31 and line 32 to the bottom of the autoclave and bubbles through the suspension which is prevented from settling by a stirrer 33 driven by a motor 34.

Within the oxidation stage formed by the autoclave 4, the molybdenum disulfide reacts with oxygen to produce molybdenum oxide and sulfuric acid in accordance with the relationship previously given and the reaction product in the form of a suspension is delivered by line 6 to a filter 7 in which the molybdenum oxide precipitate is removed as represented by the arrow 35 via line 8.

The first filtrate, containing sulfuric acid, is delivered at 9 to a neutralizing tank 10 to which lime is metered from a hopper 36 via a solids feeder 37.

The lime reacts with the sulfuric acid to form calcium sulfate (gypsum) which is carried in suspension via line 11 to a second filter 12 in which the calcium sulfate is recovered and discharged via line 13. The second filtrate, as controlled by the valves 16 and 38, is recirculated via line 14 by a pump 15 to the suspension tank 22 as will be described in greater detail below. The second filtrate can be withdrawn by a valve 38 and subjected to extraction as previously mentioned when it is desired to reclaim the impurity elements.

EXAMPLE

The molybdenum sulfide concentrate is initially brought to a suspension density of 150 g of suspended solids per liter with water and, once the system is in operation and has reached steady state, is maintained at this suspension density by recirculation of the second filtrate, make-up water being added as desired. Note, however, that the only recirculated liquid is the second filtrate.

Pump 3 feeds 200 liter/hr of the suspension at room temperature into the autoclave which in the initial reaction period reaches a temperature of 170° C. and ultimately a temperature between 230° C. and 245° C. which is maintained by the recirculating second filtrate without reheating of the latter at steady state.

45 kg/hr of oxygen is supplied at 5 and the oxygen partial pressure in the autoclave can be 5 bar or greater and is preferably between 10 and 20 bar. From the autoclave, the suspension is withdrawn and 27 kg/hr of molybdenum oxide are recovered at 8. 34 kg/hr of limestone ($CaCO_3$) is introduced at 36 to neutralize the first filtrate and 45 kg/hr of calcium sulfate dihydrate are recovered at 13.

The partially neutralized second filtrate, containing 20 g/liter sulfuric acid, is recycled at a rate of 200 liter/hr and 30 kg/hr of fresh molybdenum concentrate are added thereto so that the system can operate at steady state, i.e. the exothermically produced heat is sufficient to maintain the temperature in the oxidation stage. No external heating of the autoclave is required.

Water losses are made up by the addition of about 100 liter/hr of water which can be recovered from washing the molybdenum oxide and gypsum products.

From 3000 kg of molybdenum disulfide concentrate of the following weight analysis:

Mo = 53.7%
Cu = 1.2%
Fe = 1.7%
S = 38.8%
$H_2O$ = 3.8%
Oil = 2.1%

2528 kg of molybdenum dioxide product was obtained with the following analysis by weight:

Mo = 63.1%
Cu = 0.015%
Fe = 0.3%
S = 0.04%

The conversion terms of molybdenum was thus 99%.

Control of the pressure and temperature in the autoclave was effected exclusively by controlling the suspension density of the molybdenum sulfide suspension introduced into the autoclave by varying the recirculation rate of the second filtrate.

When the temperature in the autoclave 4 tended to fall because of the increased impurity level in the molybdenum sulfide concentrate, additional molybdenum sulfide concentrate was supplied.

When the temperature in the autoclave tended to rise because of higher levels of flotation oil in the molybdenum sulfide concentrate, water could be added to reduce or stem the temperature increase. For brief reductions in temperature the oxygen partial pressure could be dropped below 3 bar with reduction of the oxygen supply from 45 kg/hr to 40 kg/hr.

During the entire operation, oxidizing conditions were maintained in the autoclave and precluded corrosion. It was found that significant levels of copper in the suspension assisted in preventing corrosion and that high levels of copper in the recirculated second filtrate even allowed the oxygen partial pressure to be reduced further when necessary without inducing corrosion. These factors allowed for control of the reaction to maintain practically steady state conditions even with fluctuations in the condition of the molybdenum sulfide concentrate.

As shown in broken lines in the drawing, a recirculation path 17 with a pump 18 and a valve 19, cut off for operation according to the invention, may be provided when it is desirable to recirculate the output of the autoclave directly.

We claim:

1. A method of producing molybdenum oxide which comprises the steps of:
   (a) forming an aqueous suspension of a molybdenum sulfide impurity-containing concentrate having a particle size of substantially 70 microns;
   (b) subjecting the suspension produced in step (a) to an elevated oxygen partial pressure and an elevated temperature in an autoclave to oxidize the molybdenum sulfide to molybdenum oxide and produce another suspension, and maintaining the suspension density during oxidation within a range between 100 and 150 g of solids per liter;
   (c) filtering said other suspension to recover molybdenum oxide therefrom and produce a first filtrate containing sulfuric acid;
   (d) neutralizing said first filtrate at least partially by adding lime or limestone thereto to produce a third suspension containing calcium sulfate;
   (e) filtering said third suspension to recover calcium sulfate and produce a second filtrate;
   (f) recirculating said second filtrate to step (a) as the sole recirculated liquid and at a rate sufficient to maintain the suspension density of the suspension entering step (b) between substantially 100 and 150 g of solids per liter; and
   (g) controlling the temperature in said autoclave to maintain it between 230° C. and 245° C. and maintaining the pressure in said autoclave by varying said suspension density within said range.

2. The method defined in claim 1 wherein the neutralization in step (d) is carried out with calcium carbonate.

* * * * *